United States Patent [19]

Inada et al.

[11] Patent Number: 4,916,948
[45] Date of Patent: Apr. 17, 1990

[54] THERMAL FLOW SENSOR

[75] Inventors: Masanori Inada; Hichiro Ohtani; Tomoya Yamakawa, all of Himeji, Japan

[73] Assignee: Mitsubishi Denki Kabushiki Kaisha, Tokyo, Japan

[21] Appl. No.: 282,797

[22] Filed: Dec. 12, 1988

[30] Foreign Application Priority Data

Dec. 26, 1987 [JP] Japan .............. 62-197814[U]

[51] Int. Cl.4 .............................................. G01F 1/68
[52] U.S. Cl. .................................. 73/202.5; 73/204.25
[58] Field of Search ........... 73/204.26, 204.27, 204.25, 73/202.5, 195, 204.11

[56] References Cited

U.S. PATENT DOCUMENTS 4,304,129 12/1981 Kawai et al. ................ 73/204.27 X
4,494,406 1/1985 Komons et al. ............. 73/204.25 X
4,561,302 12/1985 Sumal et al. ....................... 73/202.5

FOREIGN PATENT DOCUMENTS 57112 4/1980 Japan .
66116 4/1985 Japan .

Primary Examiner—Herbert Goldstein
Attorney, Agent, or Firm—Sughrue, Mion, Zinn, Macpeak & Seas

[57] ABSTRACT

A thermal flow sensor has a housing through the inside of which a fluid is allowed to flow, and a supporting pipe passage disposed within and substantially in the center of the housing. A plurality of thermosensitive resistors are supported on the outer periphery of the supporting pipe passage and are disposed within substantially the same plane normal to the flow of the fluid. A fluid temperature sensor is provided within the supporting pipe passage. The flow rate can be detected correctly even when the flow rate of the fluid varies within that same plane, since the sensor is adapted to detect the average flow rate.

12 Claims, 2 Drawing Sheets

THERMAL FLOW SENSOR

BACKGROUND OF THE INVENTION

1. Field Of The Invention

The present invention relates to thermal flow sensors which employ thermosensitive resistors to detect the flow rate of fluids such as gases.

2. Description Of The Related Art

A flow sensor is known which detects the flow rate of a fluid from a balanced state of a bridge circuit including a thermosensitive resistor disposed in the fluid.

FIG. 1A is a front sectional view of a conventional thermal air-flow sensor, and FIG. 1B is a side sectional view of the sensor shown in FIG. 1A. Referring to these figures, the sensor has a housing 1 defining the main passage for the fluid, and a supporting pipe passage 2 provided substantially in the center of the housing 1. A thermosensitive resistor $R_H$ which comprises, for instance, a small platinum thin film resistance is provided within the supporting pipe passage 2 for converting a change in its temperature caused by the fluid into a corresponding change in its resistance, and an air temperature sensor $R_C$ is also provided within the supporting pipe passage 2 for detecting the air temperature and thus enabling the correction of any variation in the change in temperature of the air. Leads 3 and 4 are provided for the thermosensitive resistor $R_H$ and the air temperature sensor $R_C$, respectively. The leads 3 and 4 are passed through holes (not shown) formed in the housing 1 and the supporting pipe passage 2, and are connected to a control circuit 5 provided on the outer periphery of the housing 1.

FIG. 2 is a circuit diagram showing a bridge circuit including the thermosensitive resistor $R_H$ and the air temperature sensor $R_C$, and also showing a control circuit for effecting control in such a manner that the bridge circuit is maintained in a balanced state. The bridge circuit comprises resistors $R_1$ and $R_2$, in addition to the thermosensitive resistor $R_H$ and the air temperature sensor $R_C$. The bridge circuit has junctions b and f connected to the input terminals of a differential amplifier 6 the output terminal of which is connected to the base of a transistor 7. The emitter of the transistor 7 is connected to one terminal a of the bridge circuit, and its collector is connected to the anode of a DC power source 8. The fluid flows in the direction indicated by an arrow 9.

With the above-described conventional air-flow sensor, fluid rate is detected in the following manner. Before a fluid is allowed to flow, a certain voltage is applied to the bridge circuit to cause the thermosensitive resistor $R_H$ to generate heat. When the fluid i.e. air, comes into contact with the resistor $R_H$, the temperature of the resistor $R_H$ drops, thereby causing a change in the resistance of the resistor $R_H$. A current $I_H$ increased by an amount corresponding to the change in the resistance of the resistor $R_H$, i.e. to the flow rate of the fluid, is caused to flow through the resistor $R_2$, thereby bringing the bridge circuit into a balanced state. In this balanced state, the voltages at the junctions b and f are equal. On the basis of the current $I_H$, the voltage $V_O = I_H \times R_2$ at the junction b is extracted as the flow rate of the fluid from a signal outputting portion S. A signal from the signal outputting portion S is fed to a signal processing section, not shown, then processed therein, so as to determine the flow rate of the fluid. Because changes in air temperature cause variations in the change in resistance of the resistor $R_H$, the variations are corrected by the use of the air temperature sensor $R_C$.

The above-described conventional thermal flow sensor, however encounters the following problem. Since the flow of fluid within the housing 1 is not uniform, and it may be dense or coarse within the same plane, depending on such factors as the configuration of the upstream piping, there is a risk that the flow rate may not be detected correctly if the flow rate is only detected at one position by the use of a single thermosensitive resistor $R_H$, as in the conventional thermal flow sensor.

SUMMARY OF THE INVENTION

The present invention has been accomplished in order to eliminate the above-stated problem. It is an object of the present invention to provide a thermal flow sensor which is capable of detecting flow rate correctly.

According to the present invention, there is provided a thermal flow sensor which comprises: means for defining a flow of a fluid; supporting means disposed within the flow of the fluid; a plurality of thermosensitive resistors supported by the supporting means and disposed within substantially the same plane normal to the flow of the fluid; a fluid temperature sensor supported by the supporting means; a bridge circuit including the thermosensitive resistors, the fluid temperature sensor, and a plurality of resistors; a control circuit for maintaining a balanced state of the bridge circuit; and a signal outputting portion for outputting a flow rate signal which is obtained from the bridge circuit when the circuit is in a balanced state.

DESCRIPTION OF THE PREFERRED EMBODIMENT

Figure 1A:
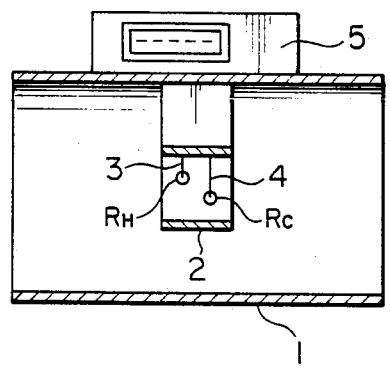
FIGS. 1A and 1B are a front sectional view and a side sectional view, respectively, of a conventional thermal flow sensor.
Figure 1B:
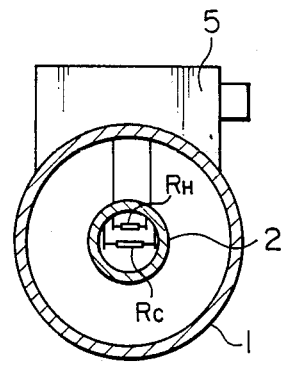
Figure 2:
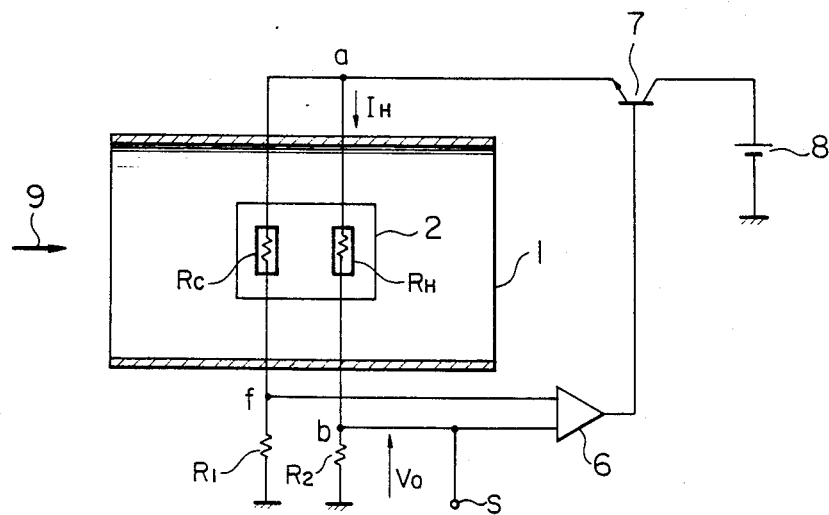
FIG. 2 is a circuit diagram of the flow sensor shown in FIGS. A and 1B.
Figure 3:
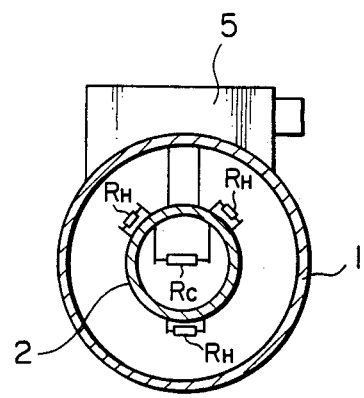
FIG. 3 is a front sectional view of a thermal flow sensor in accordance with one embodiment of the present invention.
Figure 4:
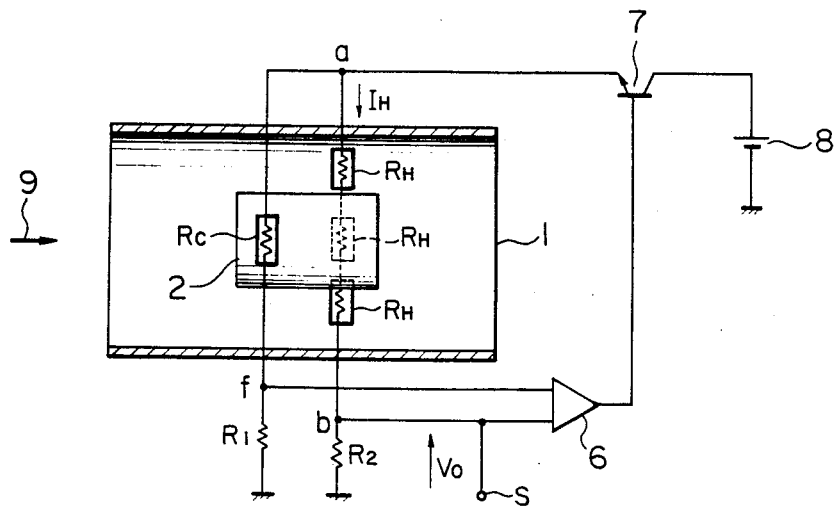
FIG. 4 is a circuit diagram of the flow sensor shown in FIG. 3.

A certain embodiment of the present invention will be described hereunder in detail with reference to the drawings. Referring to FIG. 3, there is shown a front sectional view of a thermal flow sensor, such as a thermal air-flow sensor, in accordance with one embodiment of the present invention. As shown in FIG. 3, the flow sensor has a housing 1 through which a fluid, e.g. air, a gas, is allowed to flow, a supporting means, such as a supporting pipe passage 2, which is disposed within and substantially in the center of the housing 1, a plurality of, e.g. three, thermosensitive resistors $R_H$ provided on the outer periphery of the supporting pipe passage 2 and disposed within substantially the same plane normal to the flow 9 of the fluid, and a single air temperature sensor $R_C$ which is provided within the supporting pipe passage 2 and serves as a fluid temperature sensor. The three thermosensitive resistors $R_H$ are electrically serially connected to one another, and they form a bridge circuit, together with the air temperature sensor $R_C$ and resistors $R_1$ and $R_2$, as illustrated in the circuit diagram shown in FIG. 4. Although the thermosensitive resistors $R_H$ are serially connected in the illustrated example, they may alternatively be connected in parallel.

The electric circuit of the thermal air-flow sensor having the above-described construction operates in basically the same manner as that of the known thermal flow sensor. That is, a control circuit adjusts the voltage in such a manner that the bridge circuit including the thermosensitive resistors $R_H$ and the air temperature sensor $R_C$ is maintained in a balanced state wherein the voltages at junctions b and f are equal. At this time, a current corresponding to the flow rate of the fluid flows through the thermosensitive resistors $R_H$, and the voltage $V_0$ at the junction b is output as a flow rate to a signal processing section not shown, which then calculates the flow rate of the fluid.

As has been described above, in contrast with the conventional sensor in which only one thermosensitive resistor is provided, the sensor of the present invention has a plurality of, e.g. three, thermosensitive resistors $R_H$ provided at positions separate from one another. By virtue of this arrangement, the sensor outputs, as a flow rate signal, the average of the flow rates detected by the thermosensitive resistors $R_H$. Accordingly, the flow rate of the fluid can be detected correctly even when the flow of the fluid is offset within the same plane including the thermosensitive resistors $R_H$.

Although, in the above-described embodiment, three thermosensitive resistors are employed, the number of the thermosensitive resistors used is not limited to three. Advantage similar to that described above can be achieved employing two or four or more thermosensitive resistors.

What is claimed is:
1. A thermal flow sensor comprising:
    means for defining a flow of fluid;
    supporting means comprising a supporting member having a circular cross section disposed within said flow of said fluid, said flow passing through said supporting means and over the outer periphery of said supporting means;
    a plurality of thermosensitive resistors supported in a circumferentially spaced manner by said supporting means and disposed within substantially the same plane normal to said flow of said fluid;
    a fluid temperature sensor supported by said supporting means;
    a bridge circuit including said thermosensitive resistors, said fluid temperature sensor, and a plurality of resistors;
    a control circuit for maintaining a balanced state of said bridge circuit; and
    a signal outputting portion for outputting a flow rate signal which is obtained from said bridge circuit when said circuit is in a balanced state.

2. A sensor according to claim 1, wherein said plurality of thermosensitive resistors are electrically serially connected to one another.

3. A sensor according to claim 1, wherein said supporting means comprises a supporting pipe passage.

4. A sensor according to claim 3, wherein said thermosensitive resistors are disposed on the outer periphery of said supporting pipe passage.

5. A sensor according to claim 1, comprising three thermosensitive resistors.

6. A sensor according to claim 1, comprising two thermosensitive resistors.

7. A sensor according to claim 1, comprising at least four thermosensitive resistors.

8. A thermal flow sensor comprising:
    means for defining a flow of a fluid;
    supporting means comprising a supporting pipe passage disposed within said flow of said fluid, said flow passing through said supporting means and over the outer periphery of said supporting means;
    a plurality of thermosensitive resistors supported on the outer periphery of said supporting means and disposed within substantially the same plane normal to said flow of said fluid;
    a fluid temperature sensor supported by said supporting means;
    a bridge circuit including said thermosensitive resistors, said fluid temperature sensor, and a plurality of resistors;
    a control circuit for maintaining a balanced state of said bridge circuit; and
    a signal outputting portion for outputting a flow rate signal which is obtained from said bridge circuit when said circuit is in a balanced state.

9. A sensor according to claim 8, wherein said plurality of thermosensitive resistors are electrically serially connected to one another.

10. A sensor according to claim 8, further comprising three thermosensitive resistors.

11. A sensor according to claim 8, further comprising two thermosensitive resistors.

12. A sensor according to claim 8, further comprising at least four thermosensitive resistors.

* * * * *